United States Patent Office 2,924,394
Patented Feb. 9, 1960

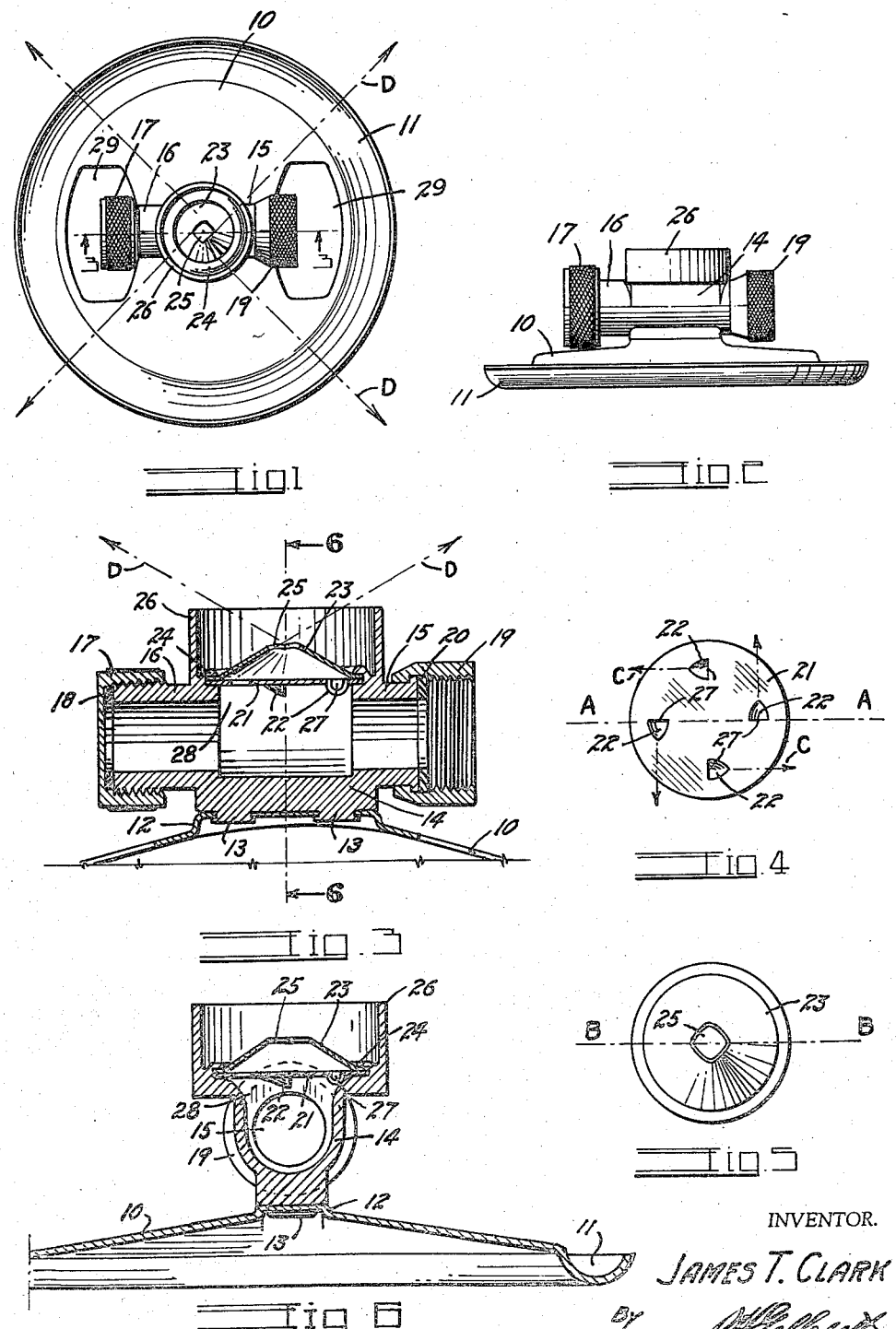

2,924,394

SET SPRINKLER FOR LAWNS

James T. Clark, Fort Morgan, Colo.

Application August 22, 1958, Serial No. 756,652

1 Claim. (Cl. 239—495)

This invention relates ot a set sprinkler for lawns and has for its principal object the provision of a simple, sturdy, and highly efficient set sprinkler for attachment to a garden hose which will provide a water spray which will completely and accurately cover a rectangular area of the lawn so as to prevent the waste usually occasioned by the overlapping of the circular sprinkling area of conventional sprinklers onto the street, sidewalk, buildings, etc.

Set sprinklers have been made for sprinkling square areas. Some of these have upwardly projecting water-distrbuting buttons which become bent or broken off in use. Others have perforations of varying sizes to produce the square spray. These varying perforations are difficult and expensive to manufacture; they become clogged with foreign materials in the water; and the surface carrying the perforations becomes dented in packing, shipping, and in use.

It is an object of this invention to avoid all of the above objections to conventional square area sprinklers and to provide an improved square area sprinkler that can withstand rough handling in shipping, storing and which will withstand the abuse to which such are subjected when they are drawn over sidewalks, paved areas, or thrown into hose piles, etc.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved set sprinkler;

Fig. 2 is a side view thereof;

Fig. 3 is an enlarged, longitudinal section taken on the line 3—3, Fig. 1;

Fig. 4 is a detail top view of a swirl disc employed in the improved sprinkler;

Fig. 5 is a similar detail top view of an orifice disc employed in the improved sprinkler; and Fig. 6 is a cross section taken on the line 6—6, Fig. 3.

In Figs. 1 and 3 the manner in which the water discharges is indicated in broken line at "D" as will be later described.

The improved sprinkler is mounted on and supported from a circular base plate 10 stamped from relatively heavy sheet metal, approximately #16 gauge, to provide an annular, downwardly-projecting, bearing bead 11 completely around its periphery so that when drawn over the lawn in any direction, it will ride freely over the ground surface without digging, hooking, or catching on surface obstructions. The surface of the base plate 10 is preferably provided with suitable clearance openings 29 and rises on a flat, conical contour from the bearing bead 11 to form an upstanding, medially located, upwardly projecting attachment boss 12 which is provided with two aligned attachment openings for attachment of the improved sprinkler.

The nozzle portion of the sprinkler is preferably formed from a die casting to provide a hollow, horizontal, cylindrical barrel 14 having two downwardly projecting lugs 13 which are inserted through the attachment openings in the boss 12, and upset or riveted to permanently retain the nozzle portion on the base plate. A feed nipple 15 communicates with one extremity of the barrel 14 and a discharge nipple 16 communicates with the other extremity thereof. The nipples 15 and 16 are in axial alignment with the barrel 14. The terminal extremity of the feed nipple 15 is provided with a swivelly mounted, internally threaded, female hose coupling 19 of a conventional type provided with an interal sealing washer 20. The terminal extremity of the discharge nipple 16 is externally threaded so that if desired a plurality of the sprinklers may be connected in series along a hose line. If used singly, the discharge nipple may be closed by means of a threaded cap 17 provided with a suitable sealing washer 18.

A horizontally-positioned circular disc opening 28 is formed in the top of the barrel 14. A circular swirl disc 21, as shown in Fig. 4, is sealed about the periphery of and covers the disc opening. The swirl disc 21 is formed from sheet brass or similar non-corrosive material. Four equally-spaced swirl scoops 22 are indented downwardly in the disc 21. The scoops are substantially triangular in plane and have inclined scoop-shaped bottoms leading from water intake openings 27. Each of the water intake openings 27 lies in a plane diametric of the axis of the disc and all of the openings face in the same tangential direction. A conical orifice disc 23, as shown in Fig. 5, corresponding in diameter to the swirl disc 21, is positioned on the latter. When the two discs are in place, the peripheral edges thereof are clamped together by rolling the metal of the barrel downwardly over the peripheral edges, as shown at 24. A quadrilateral spray orifice 25 is formed in the orifice disc 23 at the apex of the conical contour thereof. The opening 25 has a generally square shape. The four sides of the square, however, are bowed outwardly and the four corners of the square are slightly rounded, as shown in Fig. 5.

The two discs 21 and 23 are so positioned in the body, before being locked in place by the retaining roll 24, that the radius with which the openings 28 of two of the scoops 22 are aligned, as indicated by the line A—A, Fig. 4, is parallel with the axis of the body 14 and so that a diagonal of the quadrilateral opening 25, as indicated at B—B in Fig. 5, is also parallel to the axis of the barrel 14 and to the axis A—A of the swirl disc.

A cylindrical guard flange 26 is formed on the body concentric of the discs 21 and 23, and rises above the latter, as shown in Figs. 3 and 6.

Let us assume that the cap 17 is in place, and that water is introduced into the barrel 14 through the medium of a hose coupled to the coupling 19. The water discharges through the four intake openings 27 and is directed tangentially upward by the jet swirl scoops 22, as indicated by the arrow C in Fig. 4. These four tangential jets strike the conical undersurface of the distributing disc 23 at a tangential incline and swirl about the under surface of the hollow cone of the orifice disc 23 in a rapidly ascending spiral until they reach the corners of the quadrilateral orifice 25. Since the corners of the orifice are further spaced from the axis of the disc than the sides of the orifice, they provide the first outlets reached by the water thus causing major portions of the water to discharge tangentially at each of the four corners, as indicated by the flow lines D in Fig. 1. Lesser amounts of water will discharge over the curvated sides of the quadrilateral orifice 25, filling in the areas between the major portions D so that a sprinkled area substantially rectangular in outline will be covered with water.

It will be noted that the discharging jets pass above the guard flange 26, as shown at D in Fig. 3, so as not to be interfered with by the latter. The flange 26, however, serves to prevent damage to the orifice disc 23 by contact with external objects.

While a specific form of the improvement has been described and illustrated herein, it is to be understood that the same may be varied within the scope of the appended claim, without departing from the spirit of the invention.

Having thus described the invention, what is claimed and desired secured by Letters Patent is:

A set nozzle for lawn sprinkling comprising: a circular base plate; an upwardly projecting attachment boss formed on said base plate provided with attachment openings; a hollow horizontally extending cylindrical barrel having downwardly projecting lugs secured in said openings; a feed nipple at one extremity of said barrel; a discharge nipple at the other extremity of said barrel; an upwardly-opening passage formed in the top of the mid-portion of said barrel; an annular horizontally-positioned shoulder at the top of said passage; a swirl disc having downwardly extending indented scoops opening therethrough sealed on said shoulder; a conical orifice disc provided with an axially positioned discharge orifice seated on said swirl disc; a metallic roll formed in said shoulder overlying the peripheral edges of both discs; and a cylindrical guard flange formed on said shoulder about said discs and extending upwardly to a plane above the apex of said conical disc.

References Cited in the file of this patent

UNITED STATES PATENTS

| | | |
|---|---|---|
| 545,656 | Lewis | Sept. 3, 1895 |
| 1,187,401 | Thompson | June 13, 1916 |
| 2,032,064 | Meng | Feb. 25, 1936 |
| 2,065,161 | Thompson | Dec. 22, 1936 |
| 2,671,693 | Hyser et al. | Mar. 9, 1954 |